United States Patent [19]
Bornstein et al.

[11] 3,979,952
[45] Sept. 14, 1976

[54] DEVICE FOR MEASURING HEAT CONSUMPTION IN INDIVIDUAL APARTMENTS IN A CENTRALLY HEATED BUILDING

[75] Inventors: Josef Bornstein, Lidingo; Stig Ingvar Karlsson, Karlskrona, both of Sweden

[73] Assignee: AB Svensk Varmematning CB-System

[22] Filed: July 10, 1975

[21] Appl. No.: 594,878

[30] Foreign Application Priority Data
July 18, 1975 Sweden............................ 7594038

[52] U.S. Cl............................................ 73/193 R
[51] Int. Cl.$^2$................................... G01K 17/00
[58] Field of Search............... 73/15 R, 15.4, 190 R, 73/190 H, 193, 342; 235/151.3

[56] References Cited
UNITED STATES PATENTS

| | | | |
|---|---|---|---|
| 1,528,383 | 3/1925 | Schmidt | 73/190 |
| 3,526,123 | 9/1970 | Putman et al. | 73/15 |
| 3,566,669 | 3/1971 | Lawrence et al. | 73/15 |
| 3,724,267 | 4/1973 | Zoschalt | 73/190 |
| 3,812,713 | 5/1974 | Karlsson | 73/193 |

Primary Examiner—Herbert Goldstein
Attorney, Agent, or Firm—Kinzer, Plyer, Dorn & McEachran

[57] ABSTRACT

A device for measuring heat consumption in individual apartments in a centrally heated building. The device includes a temperature transducer for measuring the representative temperature in each apartment and an outside temperature transducer for measuring outside air temperature. A measuring pulse generator cyclically and sequentially supplies measuring pulses to the outdoor transducer and simultaneously to a selected one of the inside transducers. The outside temperature and selected inside temperature transducers generate electrical pulses corresponding to the temperatures measured by them. These pulses are supplied to a differential circuit which converts the electrical pulses into an electrical difference signal indicating the difference between inside and outside temperatures for the selected apartment. The output of the differential circuit is connected to an analogue/digital converter which converts the electrical difference signal into a digital signal in the form of a number of current pulses corresponding to the difference signal. Switching means connect the output of the analogue/digital converter to a counter for the selected apartment.

3 Claims, 1 Drawing Figure

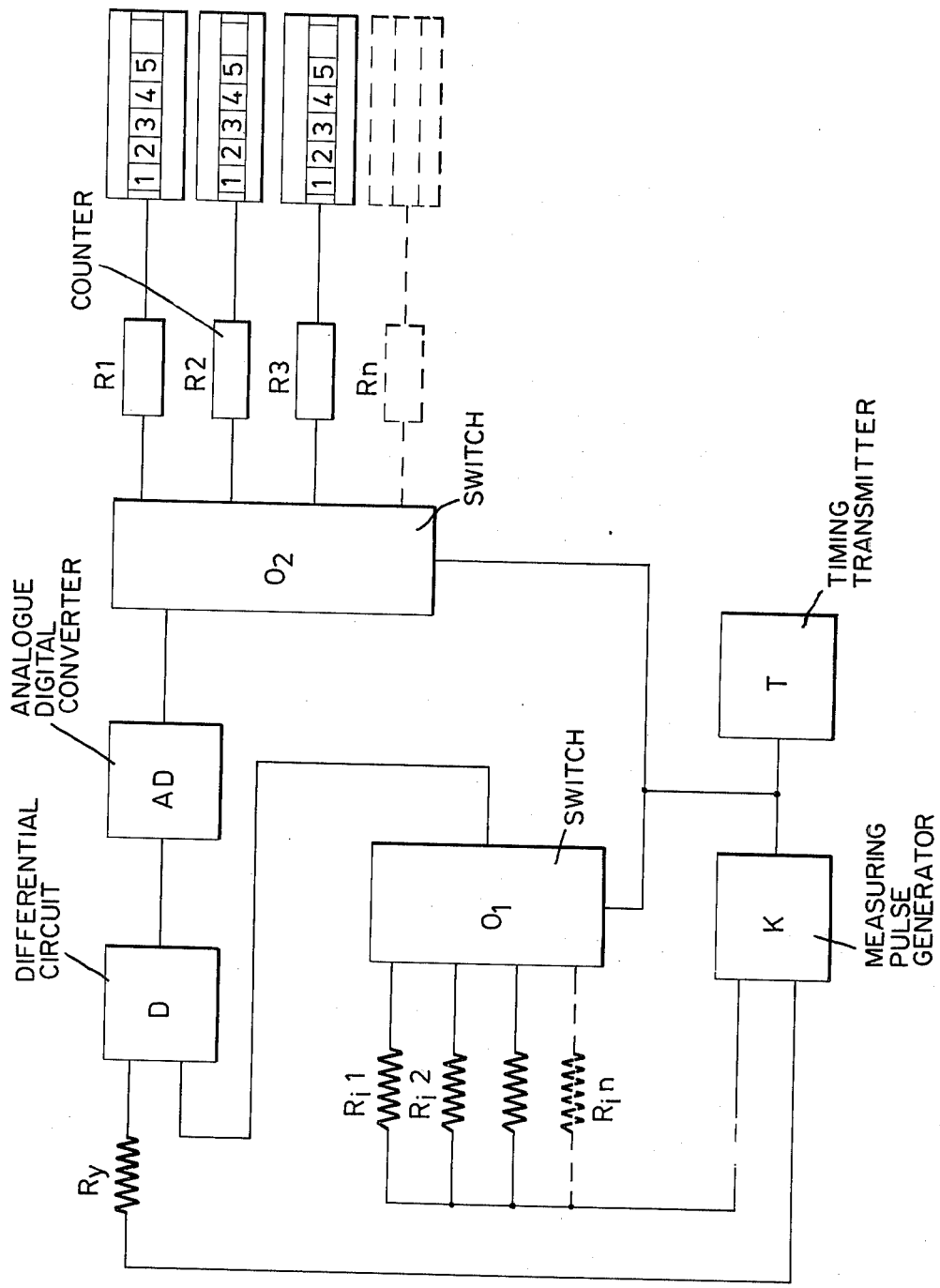

DEVICE FOR MEASURING HEAT CONSUMPTION IN INDIVIDUAL APARTMENTS IN A CENTRALLY HEATED BUILDING

The invention relates to a device for measuring heat consumption in individual apartments in a centrally heated building, the air temperature in each apartment being measured by an inside temperature transducer at least at one representative point for each apartment, while a reference temperature corresponding to the temperature of the outside air is measured by means of a reference temperature transducer. The inside temperature transducers and the reference temperature transducer are arranged to generate pulses corresponding to the measured temperatures, said pulses being converted in a differential circuit to an electrical difference signal giving the difference between inside temperature and reference temperature. Switching means working synchronously with each other are arranged to cyclically and simultaneously connect one of the inside temperature transducers to the differential circuit and to a corresponding integrating means registering the difference signal from the differential circuit.

Apparatuses of this type used so far work extremely unsatisfactorily, inter alia, because of the different temperature transducers constantly being under voltage and being passed through by current, causing self-heating of the transducers with faulty indication as a result.

It is therefore a chief object of the invention to provide a device or a system, which is not affected by the measuring currents or measuring voltages and which therefore is only affected by the ambient temperature.

This and other objects are completely realized with the invention as defined in the patent claims.

An embodiment of the invention will now be described in connection with the attached drawing in the form of a block diagram illustrating an installation.

The temperature transducers for the inside air temperature, $R_{i1}$–$R_{in}$, are placed in each apartment at a representative point for measuring the heating comfort of the apartment, e.g. in the ventilation duct for outgoing air from the living room. The transducer for the reference temperature $R_y$ is suitably placed outdoors, whereby it will measure the outside air temperature. The transducers for the inside air temperature and the outside air temperature can naturally consist of two or more series and/or parallel connected transducers, for obtaining an average temperature both for the inside as well as the outside air.

The outside temperature transducer $R_y$ is directly connected to a differential circuit D, while the temperature transducers for the inside air, $R_{i1}$–$R_{in}$, are connected to a switch $O_1$, which is arranged cyclically to connect the inner temperature transducers one at a time to the differential circuit D. The output of the differential circuit is connected to an analogue/digital converter AD, arranged to convert the analogue difference signal to a digital signal in the form of a number of current pulses corresponding to the difference signal. The output on the analogue/digital converter AD is connectable by a further switch $O_2$ to any of the counters $R_1$–$R_n$. Both the switches $O_1$ and $O_2$ are stepped simultaneously and cyclically over the positions 1 to n, whereby an inside temperature transducer $R_{ik}$ will be connected with the differential circuit D simultaneously as the analogue/digital converter AD is connected with the counter $R_k$.

In the circuit there is further incorporated a measuring pulse generator K, which is connected to both outside and inside temperature transducers, and this generator sends a very short measuring pulse, e.g. with a length of 10 ms, each time it is activated by a timing transmitter T connected to its input, whereat current pulses arise in the outside temperature transducer $R_y$ and the inside temperature transducer $R_{ik}$ connected for the moment. These short measuring pulses do not cause any heating-up of the transducer, which does not pass any other current than the measuring pulse current. The difference current pulse from the differential circuit D will hereby be proportional to the prevailing temperature difference between the outside and the inside temperature, and in the analogue/digital converter AD the analogue signal is converted to a pulse train for stepping forward the counter $R_k$, which is coupled in for the moment.

After terminated measurement, the switches $O_1$ and $O_2$ are stepped forward one step by the timing transmitter T, whereby the next measurement will be for $t_y$—$t_{ik+1}$, and will be registered by the counter $R_{k+1}$. The timing transmitter T is suitably given such a frequency that one measuring cycle is carried out per 11.25 minutes, for example. The analogue/digital converter AD is suitably given such a resolution that a pulse corresponds, for example, to $0.1° \times 11.25$ minutes = 1.125 degree minutes.

The counter is given an electronic input portion of 7 bits, i.e. it reduces the number of pulses by $2^7 = 128$. One unit on the counter R then signifies $128 \times 1.125$ degree minutes = 0.1°. 24 hours, which should be a suitable magnitude.

Each apartment thus provided with its own counter in a central meter, from where a stroke counter can easily be connected to the apartment.

The components incorporated in the electronic array are of a conventional kind.

What is claimed is:

1. A device for measuring heat consumption in individual apartments in a centrally heated building, including:
   at least one temperature transducer for measuring the representative air temperature inside each apartment,
   another temperature transducer for measuring the air temperature outside said centrally heated building,
   said inside and outside temperature transducers generating electrical pulses corresponding to the temperatures measured by each upon the receipt of electrical measuring pulses by each,
   an electrical differential circuit connected to said inside and outside temperature transducers for converting said electrical pulses from said transducers to an electrical difference signal indicating the difference between inside and outside temperatures,
   means integrating and recording said electrical difference signal from said differential circuit, and
   means to transmit measuring pulses at timed intervals simultaneously to said inside and outside temperature transducers with said measuring pulse being of short duration so as to prevent self heating of the transducers and consequential distortions of the true temperature readings.

2. The device of claim 1 in which an inside temperature transducer and an electrical difference signal recording means are provided for each of a plurality of apartments and switching means are provided for cyclically and sequentially connecting each inside transducer and its corresponding recording means with said measuring pulse generator and said differential circuit.

3. The device of claim 1 in which said means integrating and recording said electrical difference signal includes an analogue/digital converter connected to the output of said differential circuit and a counter connected to the output of said analogue/digital converter.

* * * * *